United States Patent
Tsai et al.

(10) Patent No.: US 10,470,222 B2
(45) Date of Patent: Nov. 5, 2019

(54) APPARATUSES AND METHODS FOR ON-DEMAND SYSTEM INFORMATION (SI) REQUEST THROUGH A RANDOM ACCESS PROCEDURE

(71) Applicant: MEDIATEK INC., Hsin-Chu (TW)

(72) Inventors: Chiou-Wei Tsai, Hsinchu (TW); Guo-Hau Gau, Hsinchu (TW)

(73) Assignee: MEDIATEK INC., Hsin-Chu (TW)

(*) Notice: Subject to any disclaimer, the term of this patent is extended or adjusted under 35 U.S.C. 154(b) by 5 days.

(21) Appl. No.: 15/933,473

(22) Filed: Mar. 23, 2018

(65) Prior Publication Data
US 2018/0279378 A1  Sep. 27, 2018

Related U.S. Application Data

(60) Provisional application No. 62/475,970, filed on Mar. 24, 2017.

(51) Int. Cl.
*H04W 74/08* (2009.01)
*H04L 5/00* (2006.01)
(Continued)

(52) U.S. Cl.
CPC ....... *H04W 74/0833* (2013.01); *H04L 5/0005* (2013.01); *H04L 5/0053* (2013.01);
(Continued)

(58) Field of Classification Search
None
See application file for complete search history.

(56) References Cited

U.S. PATENT DOCUMENTS

| 5,488,724 A | 1/1996 | Firoozmand |
| 9,763,158 B2 | 9/2017 | Yang et al. |

(Continued)

FOREIGN PATENT DOCUMENTS

| CN | 102448169 A | 5/2012 |
| CN | 103874126 A | 6/2014 |

(Continued)

OTHER PUBLICATIONS

"RACH Procedures and Resource Configuration;" 3GPP TSG RAN WG1 Meeting #88; Feb. 2017; pp. 1-7.
(Continued)

*Primary Examiner* — Shripal K Khajuria
(74) *Attorney, Agent, or Firm* — McClure, Qualey & Rodack, LLP

(57) ABSTRACT

A User Equipment (UE) including a wireless transceiver and a controller is provided. The wireless transceiver performs wireless transmission and reception to and from a service network. The controller initiates a random access procedure with the service network by controlling the wireless transceiver to perform wireless transmission using at least one of: a random access preamble configured for System Information (SI) request, and a corresponding Physical Random Access Channel (PRACH) time-frequency resource allocated for the random access preamble. Also, the controller receives a random access response, which includes a Random Access Preamble Identifier (RAPID) only and does not include a Timing Advance (TA) command, an uplink grant, and a temporary Cell Radio Network Temporary Identifier (C-RNTI), from the service network via the wireless transceiver.

28 Claims, 7 Drawing Sheets

(51) Int. Cl.
*H04W 72/04* (2009.01)
*H04W 74/00* (2009.01)
*H04W 48/10* (2009.01)

(52) U.S. Cl.
CPC ........ *H04W 72/0406* (2013.01); *H04W 48/10* (2013.01); *H04W 74/002* (2013.01)

(56) References Cited

U.S. PATENT DOCUMENTS

| | | | |
|---|---|---|---|
| 9,900,891 B1 | 2/2018 | Islam et al. | |
| 2008/0194252 A1 | 8/2008 | Narasimha et al. | |
| 2008/0267127 A1 | 10/2008 | Narasimha et al. | |
| 2012/0076126 A1* | 3/2012 | Yi | H04L 5/001 370/338 |
| 2012/0082099 A1 | 4/2012 | Bienas et al. | |
| 2012/0269122 A1* | 10/2012 | Lee | H04W 76/36 370/328 |
| 2013/0114516 A1* | 5/2013 | Koo | H04B 15/00 370/329 |
| 2014/0226601 A1* | 8/2014 | Park | H04W 74/0833 370/329 |
| 2014/0376466 A1 | 12/2014 | Jeong et al. | |
| 2015/0173105 A1 | 6/2015 | Bergstrom et al. | |
| 2015/0208290 A1* | 7/2015 | Seo | H04W 36/0072 370/331 |
| 2015/0326995 A1 | 11/2015 | Li et al. | |
| 2016/0192401 A1 | 6/2016 | Park et al. | |
| 2016/0219571 A1 | 7/2016 | Lin et al. | |
| 2016/0353510 A1 | 12/2016 | Zhang et al. | |
| 2016/0373222 A1 | 12/2016 | Pralea | |
| 2017/0019929 A1 | 1/2017 | Wang et al. | |
| 2017/0251460 A1 | 8/2017 | Agiwal et al. | |
| 2018/0063801 A1 | 3/2018 | Lu et al. | |
| 2018/0240869 A1 | 8/2018 | Pattanayak et al. | |

FOREIGN PATENT DOCUMENTS

| | | |
|---|---|---|
| CN | 104756582 A | 7/2015 |
| TW | 201628429 A | 8/2016 |
| WO | 2016/119228 A1 | 8/2016 |
| WO | 2016/198909 A1 | 12/2016 |
| WO | 2017/023352 A1 | 2/2017 |

OTHER PUBLICATIONS

"Discussion on beam recovery mechanism;" 3GPP TSG RAN WG1 Meeting #88; Apr. 2017; pp. 1-5.

* cited by examiner

APPARATUSES AND METHODS FOR ON-DEMAND SYSTEM INFORMATION (SI) REQUEST THROUGH A RANDOM ACCESS PROCEDURE

CROSS REFERENCE TO RELATED APPLICATIONS

This Application claims priority of U.S. Provisional Application No. 62/475,970, filed on Mar. 24, 2017, the entirety of which is incorporated by reference herein.

BACKGROUND OF THE APPLICATION

Field of the Application

The application generally relates to on-demand System Information (SI) and, more particularly, to apparatuses and methods for on-demand SI request through the random access procedure.

Description of the Related Art

With the growing demand for ubiquitous computing and networking, various cellular technologies have been developed, including Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA2000) technology, Time Division-Synchronous Code Division Multiple Access (TD-SCDMA) technology, Worldwide Interoperability for Microwave Access (WiMAX) technology, Long Term Evolution (LTE) technology, Time-Division LTE (TD-LTE) technology, and LTE-Advanced (LTE-A) technology, etc.

These multiple cellular technologies have been adopted in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, improving services, and making use of a new spectrum, and to better integrate with other open standards using OFDMA with a cyclic prefix (CP) on the downlink (DL) and on the uplink (UL), as well as to support beamforming, Multiple-Input Multiple-Output (MIMO) antenna technology, and carrier aggregation.

The System Information (SI) in 5G NR is categorized into minimum SI and other SI. The minimum SI may include information for cell selection, camping on a cell, and requesting other SI, and the minimum SI is periodically broadcasted by the network side. The other SI may include information of the neighboring cells for cell reselection, and the other SI may be configured to be periodically broadcasted to User Equipment (UE) or provided on demand at the UE's request, and the other SI may also be referred to as on-demand SI when it is configured to be provided on demand at the UE's request.

BRIEF SUMMARY OF THE APPLICATION

The present application proposes to use the random access channel for on-demand SI requests, which is a channel allowing both uplink asynchronous and synchronous transmission, and through which the UE in either the idle state, inactive state, or connected state may perform an on-demand SI request without state transition.

In a first aspect of the application, a User Equipment (UE) comprising a wireless transceiver and a controller is provided. The wireless transceiver is configured to perform wireless transmission and reception to and from a service network. The controller is configured to initiate a random access procedure with the service network by controlling the wireless transceiver to perform wireless transmission using at least one of a random access preamble configured for System Information (SI) request, and a corresponding Physical Random Access Channel (PRACH) time-frequency resource allocated for the random access preamble. Also, the controller is configured to receive a random access response, which comprises a Random Access Preamble Identifier (RAPID) only and does not comprise a Timing Advance (TA) command, an uplink grant, and a temporary Cell Radio Network Temporary Identifier (C-RNTI), from the service network via the wireless transceiver.

In a second aspect of the application, a method for on-demand SI request through a random access procedure, executed by a UE connected with a service network, is provided. The method for on-demand SI request comprises the steps of: initiating the random access procedure with the service network, using at least one of: a random access preamble configured for SI request, and a corresponding PRACH time-frequency resource allocated for the random access preamble; and receiving a random access response, which comprises a RAPID only and does not comprise a TA command, an uplink grant, and a temporary C-RNTI, from the service network.

In a third aspect of the application, a service network comprising a cellular station is provided. The cellular station is configured to respond to a random access procedure initiated by a UE, using at least one of a random access preamble configured for SI request, and a corresponding PRACH time-frequency resources allocated for the random access preamble, Also, the controller is configured to determine an RAPID corresponding to the random access preamble, and transmit a random access response, which comprises the RAPID only and does not comprise a TA command, an uplink grant, and a temporary C-RNTI, to the UE.

In a fourth aspect of the application, a method for on-demand SI request through a random access procedure, executed by a service network, is provided. The method for on-demand SI request comprises the steps of: responding to a random access procedure initiated by a UE, using at least one of: a random access preamble configured for SI request, and a corresponding PRACH time-frequency resource allocated for the random access preamble; determining an RAPID corresponding to the random access preamble; and transmitting a random access response, which comprises the RAPID only and does not comprise a TA command, an uplink grant, and a temporary C-RNTI, to the UE.

In a fifth aspect of the application, a User Equipment (UE) comprising a wireless transceiver and a controller is provided. The wireless transceiver is configured to perform wireless transmission and reception to and from a service network. The controller is configured to receive minimum SI from the service network via the wireless transceiver, determine whether there is association information corresponding to one or more types of on-demand SI in the minimum SI, and initiates a random access procedure with the service network for requesting the on-demand SI according to the determination result, wherein the association information comprises at least one of: an association between a type of on-demand SI and a random access preamble, and an association between a type of on-demand SI and a PRACH time-frequency resource.

In a sixth aspect of the application, a method for on-demand SI request through a random access procedure, executed by a UE connected to a service network, is provided. The method for on-demand SI request comprises the steps of: receiving minimum SI from the service network; determining whether there is association information corresponding to one or more types of on-demand SI in the minimum SI, wherein the association information comprises at least one of: an association between a type of on-demand SI and a random access preamble, and an association between a type of on-demand SI and a PRACH time-frequency resource; and initiating a random access procedure with the service network for requesting the on-demand SI according to the determination result.

Other aspects and features of the present application will become apparent to those with ordinarily skill in the art upon review of the following descriptions of specific embodiments of the UEs, cellular stations, and the methods for on-demand SI request.

BRIEF DESCRIPTION OF DRAWINGS

The application can be more fully understood by reading the subsequent detailed description and examples with references made to the accompanying drawings, wherein.

DETAILED DESCRIPTION OF THE APPLICATION

The following description is made for the purpose of illustrating the general principles of the application and should not be taken in a limiting sense. It should be understood that the embodiments may be realized in software, hardware, firmware, or any combination thereof. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
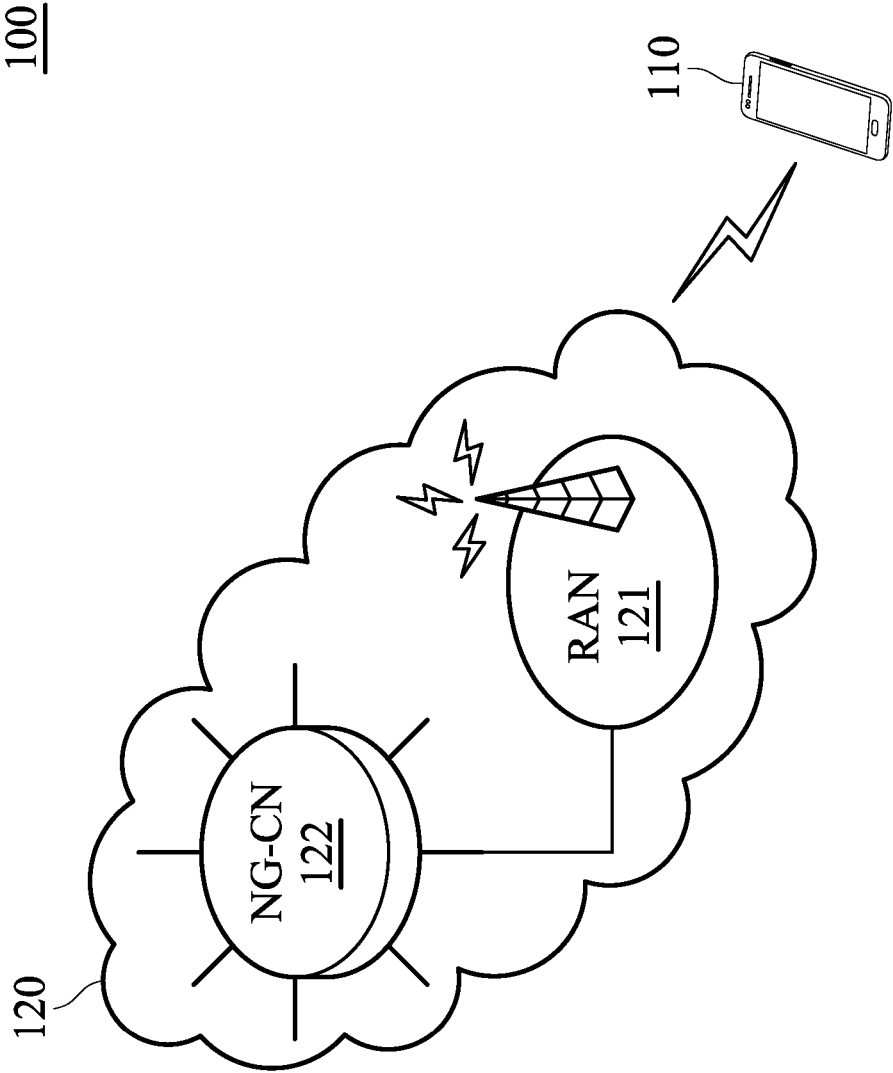
FIG. 1 is a block diagram of a wireless communication environment according to an embodiment of the application.

FIG. 1 is a block diagram of a wireless communication environment according to an embodiment of the application. The wireless communication environment 100 includes a User Equipment (UE) 110 and a 5G NR network 120, wherein the UE 110 may receive system information, including minimum SI and other SI, from the 5G NR network 120, and may be wirelessly connected to the 5G NR network 120 for obtaining mobile services. Please note that, in the present application, the other SI is configured to be provided on demand at the UE's request, and the other SI may also be called on-demand SI.

The UE 110 may be a feature phone, a smartphone, a panel Personal Computer (PC), a laptop computer, or any wireless communication device supporting the cellular technology (i.e., the 5G NR technology) utilized by the 5G NR network 120. Particularly, the wireless communication device employs the beamforming technique for wireless transmission and/or reception.

The 5G NR network 120 includes a Radio Access Network (RAN) 121 and a Next Generation Core Network (NG-CN) 122.

The RAN 121 is responsible for processing radio signals, terminating radio protocols, and connecting the UE 110 with the NG-CN 122. In addition, the RAN 121 is responsible for periodically broadcasting the minimum SI and providing the other SI at the request of the UE 110. The RAN 121 may include one or more cellular stations, such as gNBs, which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

The NG-CN 122 generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

It should be noted that the 5G NR network 120 depicted in FIG. 1 is for illustrative purposes only and is not intended to limit the scope of the application. The application could be applied to other cellular technologies, such as a future enhancement of the 5G NR technology.

Figure 2:
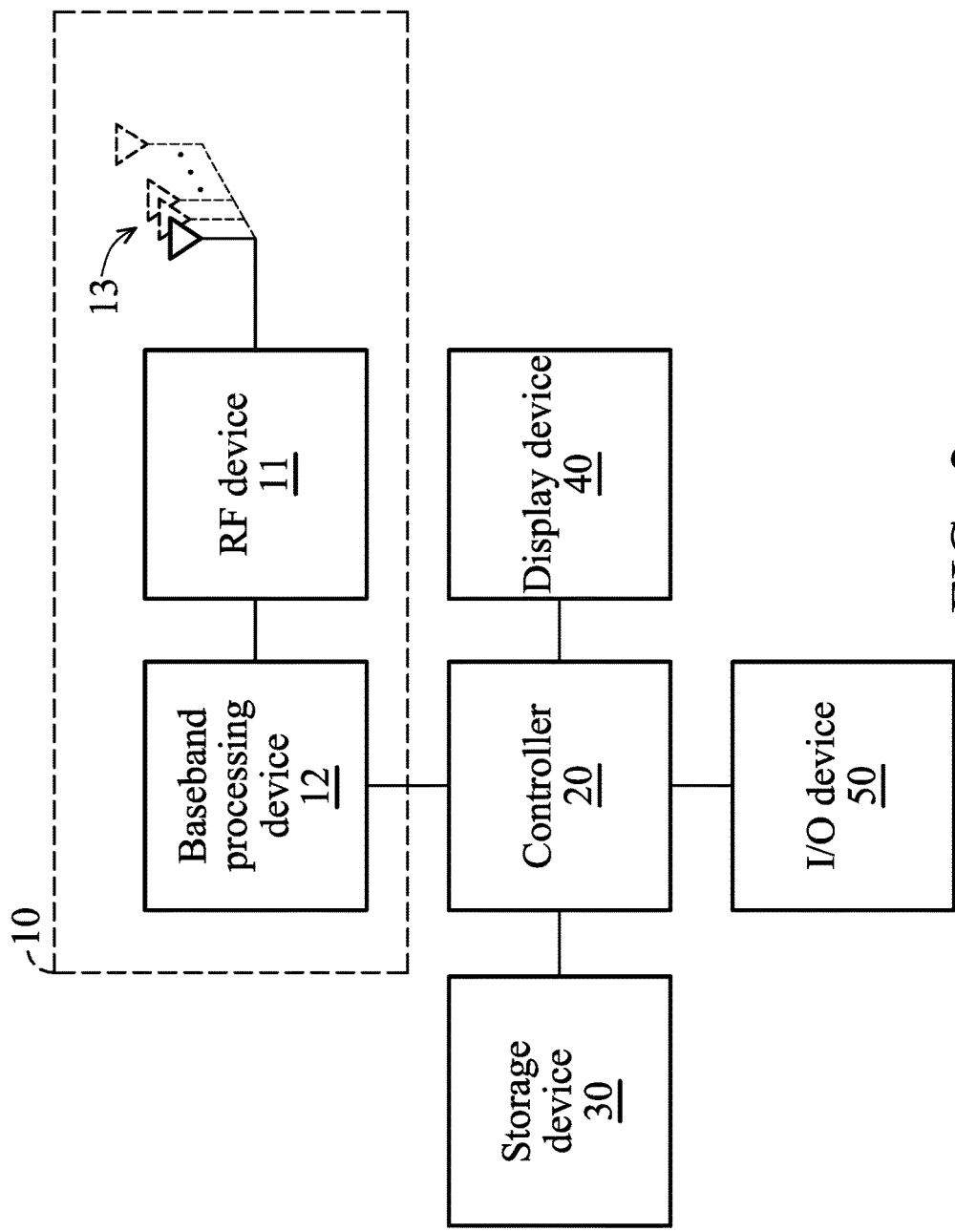
FIG. 2 is a block diagram illustrating the UE 110 according to an embodiment of the application.

FIG. 2 is a block diagram illustrating the UE 110 according to an embodiment of the application. The UE 110 includes a wireless transceiver 10, a controller 20, a storage device 30, a display device 40, and an Input/Output (I/O) device 50.

The wireless transceiver 10 is configured to perform wireless transmission and reception to and from the RAN 121. Specifically, the wireless transceiver 10 includes a Radio Frequency (RF) device 11, a baseband processing device 12, and antenna(s) 13, wherein the antenna(s) 13 may include one or more antennas for beamforming. The baseband processing device 12 is configured to perform baseband signal processing and control the communications between subscriber identity card(s) (not shown) and the RF device 11. The baseband processing device 12 may contain multiple hardware components to perform the baseband signal processing, including Analog-to-Digital Conversion (ADC)/Digital-to-Analog Conversion (DAC), gain adjusting, modulation/demodulation, encoding/decoding, and so on. The RF device 11 may receive RF wireless signals via the antenna(s) 13, convert the received RF wireless signals to baseband signals, which are processed by the baseband processing device 12, or receive baseband signals from the baseband processing device 12 and convert the received baseband signals to RF wireless signals, which are later transmitted via the antenna(s) 13. The RF device 11 may also contain multiple hardware devices to perform radio frequency conversion. For example, the RF device 11 may comprise a mixer to multiply the baseband signals with a carrier oscillated in the radio frequency of the supported cellular technologies, wherein the radio frequency may be any radio frequency (e.g., 30 GHz-300 GHz for mmWave) utilized in the 5G NR technology, or another radio frequency, depending on the cellular technology in use.

The controller 20 may be a general-purpose processor, a Micro Control Unit (MCU), an application processor, a Digital Signal Processor (DSP), or the like, which includes various circuits for providing the functions of data processing and computing, controlling the wireless transceiver 10 for wireless communications with the RAN 121, storing and retrieving data (e.g., program code) to and from the storage device 30, sending a series of frame data (e.g. representing text messages, graphics, images, etc.) to the display device 40, and receiving signals from the I/O device 50. In particular, the controller 20 coordinates the aforementioned operations of the wireless transceiver 10, the storage device 30, the display device 40, and the I/O device 50 for performing the method for on-demand SI request through a random access procedure.

In another embodiment, the controller 20 may be incorporated into the baseband processing device 12, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 is a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing instructions and/or program code of applications, communication protocols, and/or the method for on-demand SI request through a random access procedure.

The display device 40 may be a Liquid-Crystal Display (LCD), a Light-Emitting Diode (LED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MIMI) for interaction with users.

It should be understood that the components described in the embodiment of FIG. 2 are for illustrative purposes only and are not intended to limit the scope of the application. For example, the UE 110 may include more components, such as a power supply, or a Global Positioning System (GPS) device, wherein the power supply may be a mobile/replaceable battery providing power to all the other components of the UE 110, and the GPS device may provide the location information of the UE 110 for use of some location-based services or applications.

Figure 3:
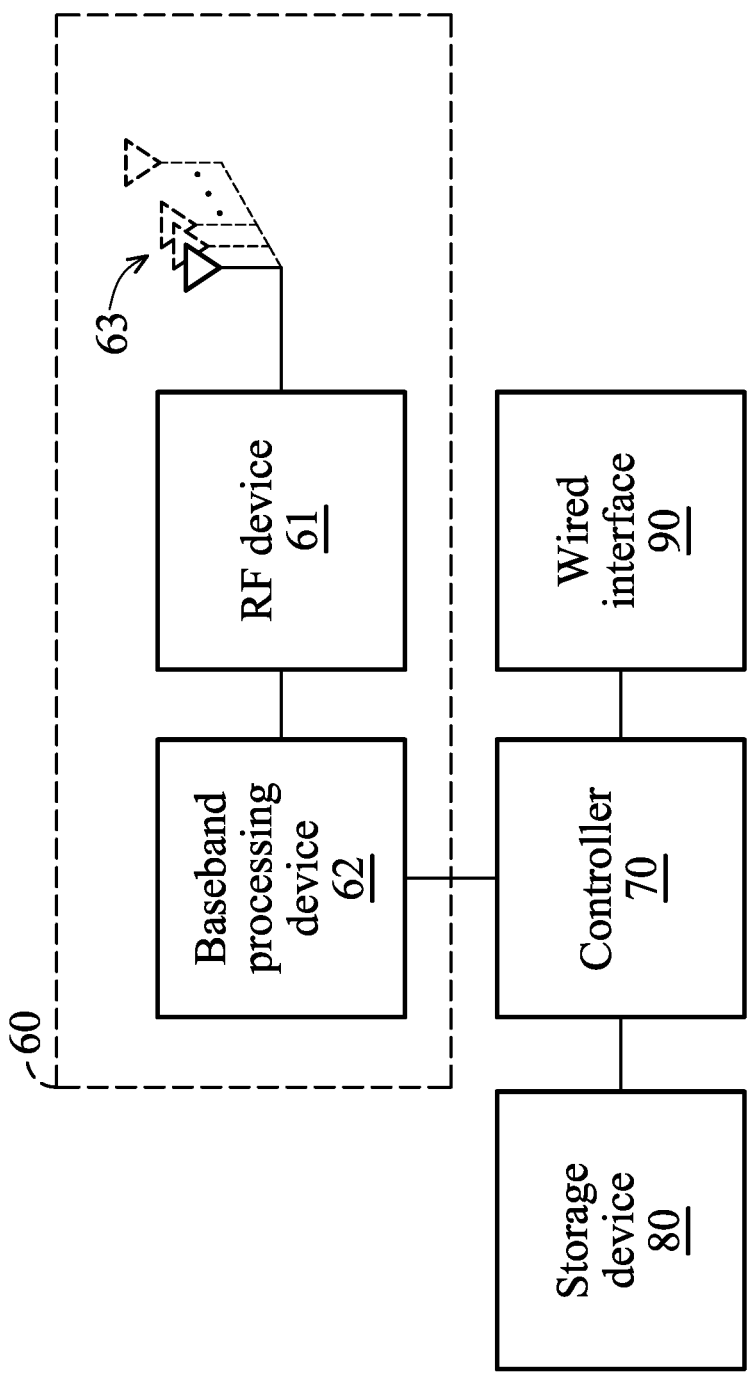
FIG. 3 is a block diagram illustrating a cellular station according to an embodiment of the application.

FIG. 3 is a block diagram illustrating a cellular station according to an embodiment of the application. The cellular station may be a 5G cellular station, such as a gNB or TRP. The cellular station includes a wireless transceiver 60, a controller 70, a storage device 80, and a wired interface 90.

The wireless transceiver 60 is configured to perform wireless transmission and reception to and from the UE 110. Specifically, the wireless transceiver 60 includes an RF device 61, a baseband processing device 62, and antenna(s) 63, wherein the antenna(s) 63 may include one or more antennas for beamforming. The functions of the RF device 61, the baseband processing device 62, and the antenna(s) 63 are similar to those of the RF device 11, the baseband processing device 12, and the antenna(s) 13 as described in the embodiment of FIG. 2, and thus, the detailed description is not repeated herein for brevity.

The controller 70 may be a general-purpose processor, an MCU, an application processor, a DSP, or the like, which includes various circuits for providing the functions of data processing and computing, controlling the wireless transceiver 60 for wireless communications with the UE 110, storing and retrieving data (e.g., program code) to and from the storage device 80, and sending/receiving messages to/from other network entities (e.g., other cellular stations in the RAN 121 or other network entities in the NG-CN 122) through the wired interface 90. In particular, the controller 70 coordinates the aforementioned operations of the wireless transceiver 60, the storage device 80, and the wired interface 90 to perform the method for on-demand SI request through a random access procedure.

In another embodiment, the controller 70 may be incorporated into the baseband processing device 62, to serve as a baseband processor.

As will be appreciated by persons skilled in the art, the circuits of the controller 70 will typically include transistors that are configured in such a way as to control the operation of the circuits in accordance with the functions and operations described herein. As will be further appreciated, the specific structure or interconnections of the transistors will typically be determined by a compiler, such as an RTL compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 80 may be a memory, such as a FLASH memory or an NVRAM, or a magnetic storage device, such as a hard disk or a magnetic tape, or an optical disc, or any combination thereof for storing instructions and/or program code of applications, communication protocols, and/or the method for on-demand SI request through a random access procedure.

The wired interface 90 is responsible for providing wired communications with other network entities, such as other cellular stations in the RAN 121, or other network entities in the NG-CN 122. The wired interface 90 may include a cable modem, an Asymmetric Digital Subscriber Line (ADSL) modem, a Fiber-Optic Modem (FOM), and/or an Ethernet network interface.

It should be understood that the components described in the embodiment of FIG. 3 are for illustrative purposes only and are not intended to limit the scope of the application. For example, the cellular station may further include other functional devices, such as a display device (e.g., LCD, LED display, or EPD, etc.), an I/O device (e.g., button, keyboard, mouse, touch pad, video camera, microphone, speaker, etc.), and/or a power supply, etc.

Figure 4:
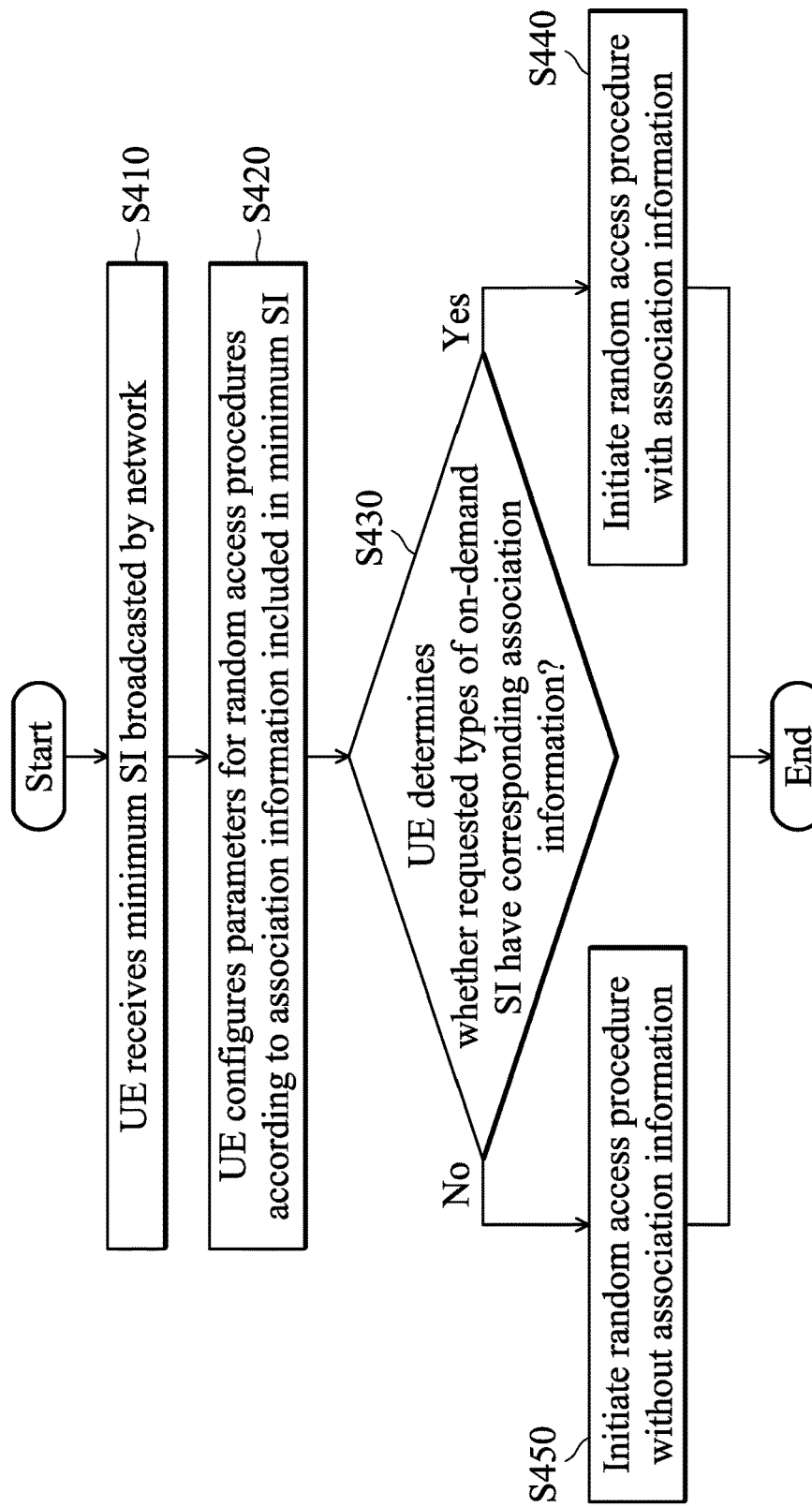
FIG. 4 is a flow chart illustrating the UE configuration upon reception of the minimum SI according to an embodiment of the application.

The system information (SI) in 5G NR includes minimum SI and the other SI. Minimum SI is periodically broadcasted. The minimum SI comprises basic information required for initial access to a cell and information for acquiring any other SI broadcast periodically or provisioned via an on-demand basis. The other SI encompasses everything not included in the minimum SI. The other SI may either be broadcasted, or provisioned in a dedicated manner, either triggered by the network or upon request from the UE. Before the UE sends a request for the other SI, it needs to know whether the other SI is available in the cell and whether the other SI is broadcasted or not (e.g. by checking the minimum SI). The UE in the RRC_IDLE state or RRC_INACTIVE state should be able to request the other SI without state transition. FIG. 4 is a flow chart illustrating the UE configuration upon reception of the minimum SI according to an embodiment of the application. To begin with, the UE receives the minimum SI broadcasted by the network (step S410). In one embodiment, the minimum SI may be broadcasted by a cellular station (e.g., a gNB or TRP) of the network. The minimum SI may include information for cell selection, camping on a cell, and requesting other SI (i.e., on-demand SI). Specifically, the information included in the minimum SI for requesting on-demand SI includes a set of random access preambles configured for SI request and/or corresponding Physical Random Access Channel (PRACH) time-frequency resource(s).

For example, there may be 64 random access preambles in total for the 5G NR technology, and some of the 64 random access preambles may be dedicated and reserved for SI request (e.g., preamble 1 for requesting on-demand SI type-I, preamble 2 for requesting on-demand SI type-2, and so on), while others may be used for regular random access purpose (e.g., preambles 33~64 for regular random access purpose). That is, there may be an association between the on-demand SI types and the random access preambles configured for SI request.

Please note that the regular random access purpose refers to the situation where the random access procedure is triggered for various reasons other than SI request. The reasons for triggering a regular random access procedure may include: 1) the UE requires uplink synchronization with the gNB for sending uplink data, 2) the gNB receives downlink data for the UE but the uplink synchronization with the UE is lost, 3) the UE does not have any grant to send uplink data and the uplink resources for scheduled transmission are released or not configured, etc.

Alternatively, specific PRACH time-frequency resource(s) may be allocated dedicatedly for SI request, and all random access preambles within the allocated PRACH time-frequency resources are dedicated and reserved for SI request (e.g., PRACH time-frequency resource block 1 for requesting on-demand SI type-I, PRACH time-frequency resource block 2 for requesting on-demand SI type-2, and so on), while the random access preambles within other PRACH time-frequency resources are used for regular random access purpose. That is, there may be an association between the on-demand SI types and PRACH time-frequency resources for SI request.

Subsequent to step S410, the UE configures the parameters for random access procedures according to the information for requesting on-demand SI (i.e., association information), which is included in the minimum SI (step S420).

Next, when the UE wishes to request one or more types of on-demand SI, it determines whether the requested types of on-demand SI have corresponding association information (step S430), and if so, initiates a random access procedure with the association information corresponding to the requested types of on-demand SI (step S440). The random access procedure in step S440 will be further described in details in FIG. 5.

Subsequent to step S430, if there's no corresponding association information for the requested types of on-demand SI, the UE initiates a random access procedure without association information (step S450). The random access procedure in step S450 will be further described in details in FIG. 7.

Figure 5:
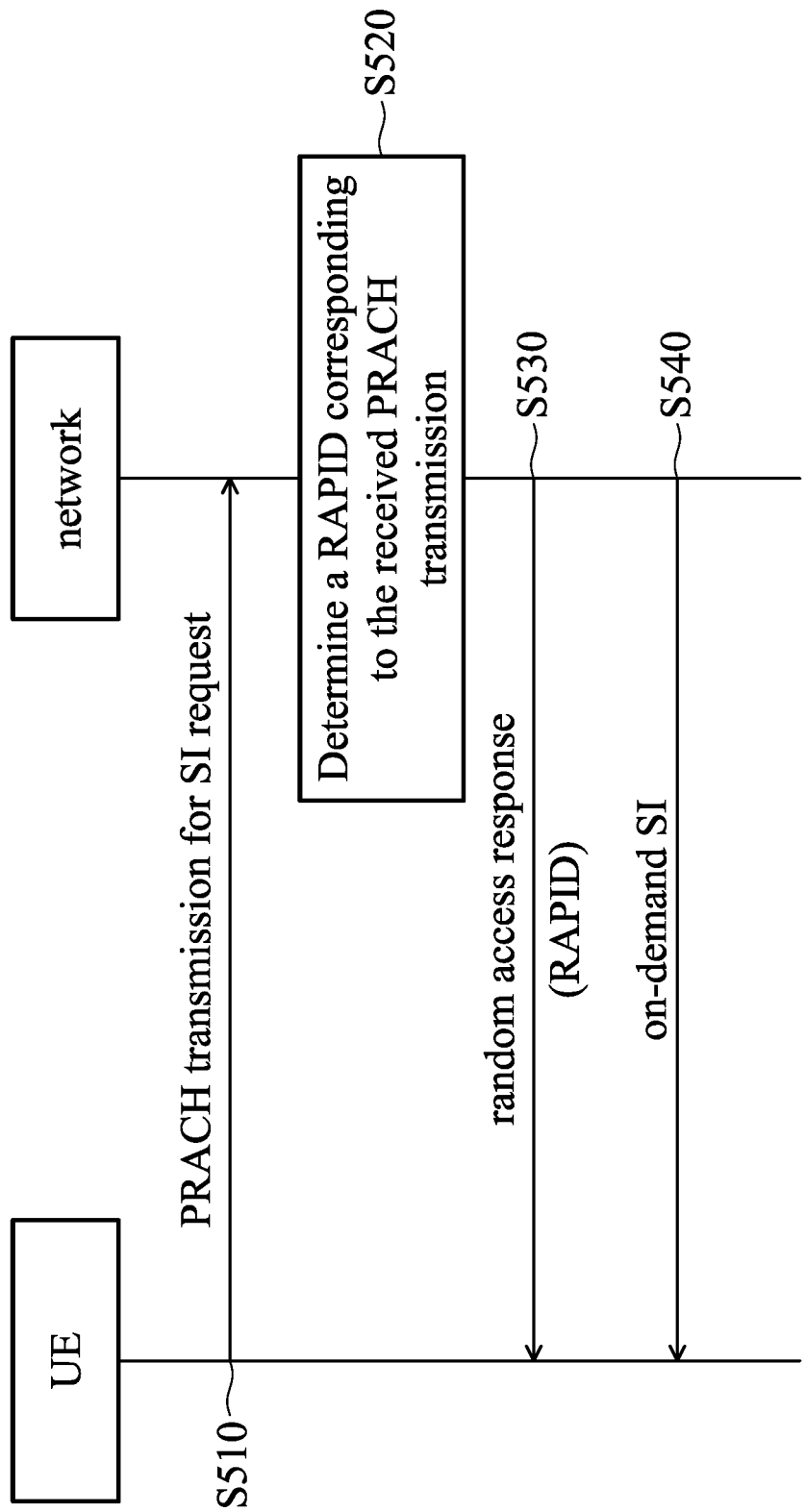
FIG. 5 is a message sequence chart illustrating the method for on-demand SI request through a random access procedure according to an embodiment of the application.

FIG. 5 is a message sequence chart illustrating the method for on-demand SI request through a random access procedure according to an embodiment of the application. Please note that the embodiment involves the operations of the UE and the network (e.g., a gNB or TRP). In this embodiment, there may be an association between the on-demand SI types and the set of random access preambles configured for SI request, and/or an association between the on-demand SI types and PRACH time-frequency resources for SI request.

To begin with, the UE performs PRACH transmission for SI request (step S510). For example, the PRACH transmission may refer to the transmission of a random access preamble configured for SI request according to the association between the on-demand SI types and the set of random access preambles configured for SI request; or the PRACH transmission may refer to the transmission of a random access preamble within the PRACH time-frequency resources dedicated and reserved for SI request according to the association between the on-demand SI types and PRACH time-frequency resources for SI request.

The association information may be entirely included in the minimum SI; or the association information may be partially included in the minimum SI, while the rest parts of the association information may be predetermined in the 3GPP specifications. In another embodiment, the association information may be entirely predetermined in the 3GPP specifications and the minimum SI does not need to include any association information.

Subsequently, the network determines a Random Access Preamble Identifier (RAPID) corresponding to the received PRACH transmission (step S520), and then transmits a random access response including only the RAPID to the UE (step S530).

Please note that, unlike the random access response for regular random access purpose, the random access response in step S530 does not include a Timing Advance (TA) command/information, an uplink grant, and a temporary Cell Radio Network Temporary Identifier (C-RNTI), due to the fact that this is a scenario of on-demand SI request and there will be no following uplink transmission (i.e., the UE does not perform the scheduled transmission in response to receiving the random access response including only the RAPID).

When receiving the random access response including the RAPID corresponding to the transmitted preamble, the UE may consider this random access procedure to be successfully completed.

After transmitting the random access response, the network transmits the on-demand SI of the requested type(s) to the UE (step S540), and the method ends. Since the SI request is indicated in the first step (e.g., step S510) using the first message (also called Msg1), the above-mentioned random access procedure with the association information (e.g., FIG. 5) may be realized as a Msg1-based SI request method.

Figure 6:
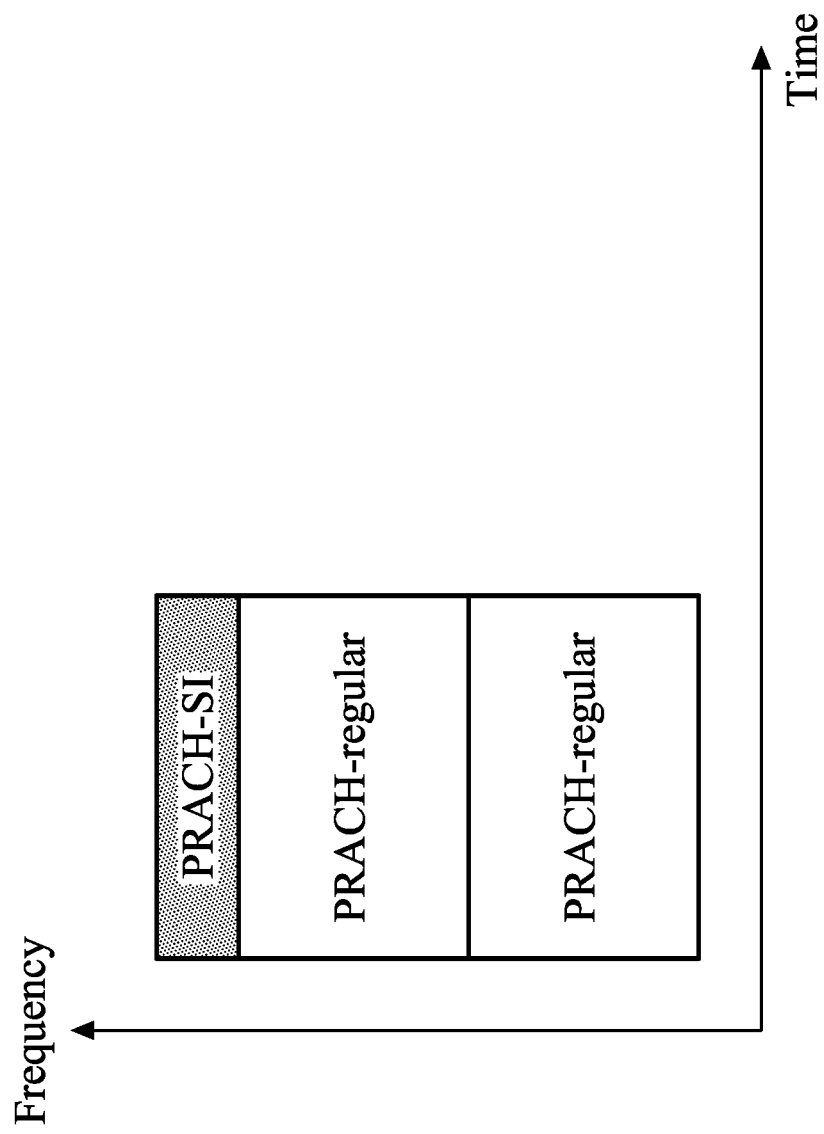
FIG. 6 is a schematic diagram illustrating an exemplary allocation of PRACH time-frequency resources for SI request according to an embodiment of the application.

FIG. 6 is a schematic diagram illustrating an exemplary allocation of PRACH time-frequency resources for SI request according to an embodiment of the application. As shown in FIG. 6, the PRACH time-frequency resources for SI request are denoted as "PRACH-SI", while the PRACH time-frequency resources for regular random access purpose are denoted as "PRACH-regular". It should be noted that the bandwidth of the PRACH time-frequency resources for SI request (i.e., the bandwidth used for transmitting a random access preamble for SI request) can be narrower than the bandwidth of the PRACH time-frequency resources for regular random access purpose (i.e., the bandwidth required for transmitting a random access preamble for regular random access purpose), due to the fact that asynchronous transmission is assumed and timing advance estimation is required in the case of regular random access, while no TA estimation is required in the case of on-demand SI request. Consequently, the dedicated and narrow band PRACH for on-demand SI request may reduce Multiple Access Interference (MAI) to normal PRACH (i.e., the PRACH used for regular random access purpose), and may improve radio resource utilization. Moreover, the bandwidth of the time-frequency resources for SI request may be extended whenever a new on-demand SI type is introduced in the future enhancement of the 5G NR technology.

Figure 7:
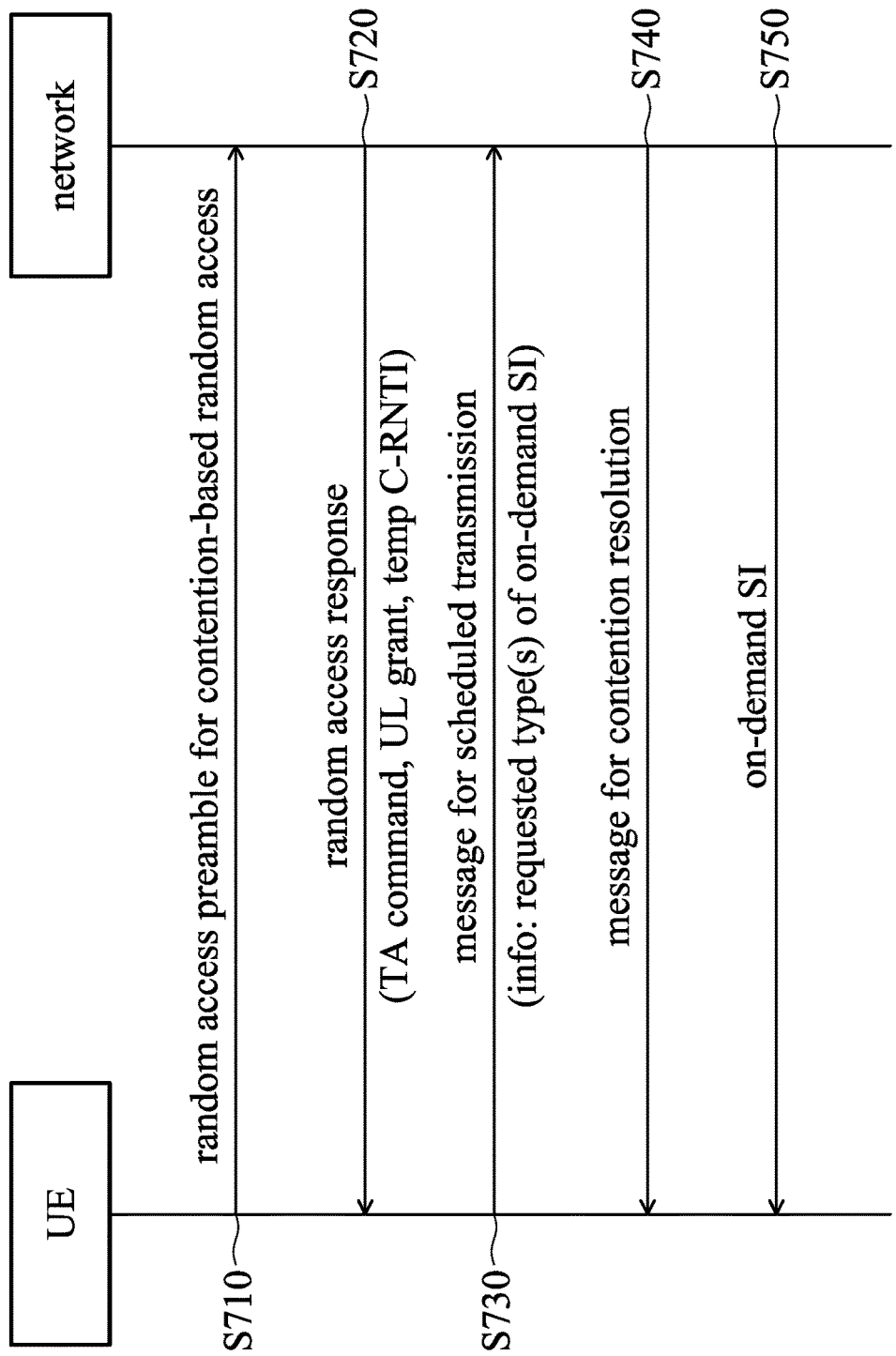
FIG. 7 is a message sequence chart illustrating the method for on-demand SI request through a random access procedure according to another embodiment of the application.

FIG. 7 is a message sequence chart illustrating the method for on-demand SI request through a random access procedure according to another embodiment of the application. In this embodiment, there is no corresponding association information for the requested types of on-demand SI, or the PRACH preamble and/or PRACH time-frequency resource(s) specific to the SI which the UE needs to acquire is not included in minimum SI.

To begin with, the UE transmits a random access preamble configured for contention-based random access procedures (i.e., for regular random access purpose) to the network (e.g., a gNB or TRP) (step S710). Specifically, the random access preamble is randomly selected with equal probability from a set of random access preambles configured for contention-based random access procedures.

Next, when receiving the random access preamble, the network prepares a random access response which includes a TA command, an uplink grant, and a temporary C-RNTI, and then transmits the random access response to the UE (step S720).

Subsequently, in response to receiving the random access response, the UE transmits a message for scheduled transmission (also called message-3 in contention-based random access procedures), which includes information requesting one or more types of on-demand SI, to the network (step S730).

When receiving the message for scheduled transmission, the network transmits a message for contention resolution (also called message-4 in contention-based random access procedures) to the UE to acknowledge the reception of the message for scheduled transmission (step S740). This acknowledgement response may be a response including only the RAPID or a normal random access response. The UE considers the message-3 is successfully received by the network based on the reception of the message-4 while the temporary C-RNTI received in message-2 is used for the reception of the message-4.

After that, the network transmits the on-demand SI of the requested types to the UE (step S750), and the method ends. Since the SI request is indicated in the third step (e.g., step S730) using the message-3 (also called Msg3), the above-mentioned random access procedure without the association information (e.g., FIG. 7) may be realized as a Msg3-based SI request method.

In view of the forgoing embodiments, it will be appreciated that the present application realizes on-demand SI request through the random access procedure which utilizes a channel (i.e., PRACH) allowing both uplink asynchronous and synchronous transmission. Advantageously, the UE in either the idle state, inactive state, or connected state may perform on-demand SI request without state transition.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

What is claimed is:
1. A User Equipment (UE), comprising:
    a wireless transceiver, configured to perform wireless transmission and reception to and from a service network; and
    a controller, configured to initiate a random access procedure with the service network by controlling the wireless transceiver to perform wireless transmission using at least one of a random access preamble configured for System Information (SI) request, and a corresponding Physical Random Access Channel (PRACH) time-frequency resource allocated for the random access preamble, and receive a random access response, which comprises a Random Access Preamble Identifier (RAPID) only and does not comprise a Timing Advance (TA) command, an uplink grant, and a temporary Cell Radio Network Temporary Identifier (C-RNTI), from the service network via the wireless transceiver.

2. The UE of claim 1, wherein the RAPID corresponds to the random access preamble.

3. The UE of claim 1, wherein the controller is further configured to receive, via the wireless transceiver, minimum SI broadcasted by the service network, and based on the minimum SI, configure parameters for at least one of: a set of random access preambles configured for SI request, and a corresponding PRACH time-frequency resource.

4. The UE of claim 1, wherein the controller is further configured to receive on-demand SI corresponding to the random access preamble from the service network via the wireless transceiver, after receiving the random access response.

5. The UE of claim 1, wherein the controller is further configured to consider the random access procedure successfully completed and not transmit a message for a scheduled transmission to the service network via the wireless transceiver, in response to receiving the random access response comprising the RAPID only.

6. The UE of claim 1, wherein the random access preamble is transmitted on a time-frequency resource which is dedicated for SI request via a PRACH.

7. A method for on-demand SI request through a random access procedure, executed by a UE connected with a service network, comprising:
initiating the random access procedure with the service network, using at least one of: a random access preamble configured for SI request, and a corresponding PRACH time-frequency resource allocated for the random access preamble; and
receiving a random access response, which comprises a RAPID only and does not comprise a TA command, an uplink grant, and a temporary C-RNTI, from the service network.

8. The method of claim 7, wherein the RAPID corresponds to the random access preamble.

9. The method of claim 7, further comprising:
receiving minimum SI broadcasted by the service network; and
based on the minimum SI, configuring parameters for at least one of: a set of random access preambles configured for SI request, and a corresponding PRACH time-frequency resource.

10. The method of claim 7, further comprising:
receiving on-demand SI corresponding to the random access preamble from the service network, after receiving the random access response.

11. The method of claim 7, further comprising:
considering the random access procedure successfully completed and not transmitting a message for a scheduled transmission to the service network, in response to receiving the random access response comprising the RAPID only.

12. The method of claim 7, wherein the random access preamble is transmitted on a time-frequency resource which is dedicated for SI request via a PRACH.

13. A service network, comprising:
a cellular station, configured to respond to a random access procedure initiated by a UE, which uses at least one of a random access preamble configured for SI request, and a corresponding PRACH time-frequency resources allocated for the random access preamble, determine an RAPID corresponding to the random access preamble, and transmit a random access response, which comprises the RAPID only and does not comprise a TA command, an uplink grant, and a temporary C-RNTI, to the UE.

14. The service network of claim 13, wherein the cellular station is further configured to broadcast minimum SI to the UE, and the minimum SI comprises at least one of: a set of random access preambles configured for SI request, and a corresponding PRACH time-frequency resource.

15. The service network of claim 13, wherein the cellular station is further configured to transmit on-demand SI corresponding to the random access preamble to the UE, after transmitting the random access response.

16. The service network of claim 13, wherein the random access preamble is received on a time-frequency resource which is dedicated for SI request via a PRACH.

17. A method for on-demand SI request through a random access procedure, executed by a service network, comprising:
responding to a random access procedure initiated by a UE, which uses at least one of: a random access preamble configured for SI request, and a corresponding PRACH time-frequency resource allocated for the random access preamble;
determining an RAPID corresponding to the random access preamble; and
transmitting a random access response, which comprises the RAPID only and does not comprise a TA command, an uplink grant, and a temporary C-RNTI, to the UE.

18. The method of claim 17, further comprising:
broadcasting minimum SI to the UE, which comprises at least one of: a set of random access preambles configured for SI request, and a corresponding PRACH time-frequency resource configured for SI request.

19. The method of claim 17, further comprising:
transmitting on-demand SI corresponding to the random access preamble to the UE, after transmitting the random access response.

20. The method of claim 17, wherein the random access preamble is received on a time-frequency resource which is dedicated for SI request via a PRACH.

21. A UE, comprising:
a wireless transceiver, configured to perform wireless transmission and reception to and from a service network; and
a controller, configured to receive minimum SI from the service network via the wireless transceiver, determine whether there is association information corresponding to one or more types of on-demand SI in the minimum SI, and initiates a random access procedure with the service network for requesting the on-demand SI according to the determination result,
wherein the association information comprises at least one of: an association between a type of on-demand SI and a random access preamble, and an association between a type of on-demand SI and a PRACH time-frequency resource.

22. The UE of claim 21, wherein, when the determination result indicates that there is association information corresponding to the types of on-demand SI, the random access procedure comprises:
controlling the wireless transceiver to perform wireless transmission to the service network using at least one of: a random access preamble configured for SI request, and a corresponding PRACH time-frequency resource allocated for the random access preamble; and
receiving a random access response, which comprises a RAPID only and does not comprise a TA command, an uplink grant, and a temporary C-RNTI, from the service network via the wireless transceiver.

23. The UE of claim 21, wherein, when the determination result indicates that there is no association information corresponding to the types of on-demand SI, the random access procedure comprises:
transmitting a random access preamble configured for contention-based random access procedures to the service network via the wireless transceiver;
receiving a random access response corresponding to the random access preamble from the service network via the wireless transceiver; and transmitting a message for a scheduled transmission, which comprises information requesting the on-demand SI, to the service network via the wireless transceiver, in response to receiving the random access response.

24. The UE of claim 23, wherein the UE selects the random access preamble to be transmitted randomly from a set of random access preambles configured by the service network for contention-based random access procedures.

25. A method for on-demand SI request through a random access procedure, executed by a UE connected to a service network, comprising:
    receiving minimum SI from the service network;
    determining whether there is association information corresponding to one or more types of on-demand SI in the minimum SI,
    wherein the association information comprises at least one of: an association between a type of on-demand SI and a random access preamble, and an association between a type of on-demand SI and a PRACH time-frequency resource; and
    initiating a random access procedure with the service network for requesting the on-demand SI according to the determination result.

26. The method of claim 25, wherein, when the determination result indicates that there is association information corresponding to the types of on-demand SI, the random access procedure comprises:
    performing wireless transmission using at least one of: a random access preamble configured for SI request, and a corresponding PRACH time-frequency resource allocated for the random access preamble; and
    receiving a random access response, which comprises a RAPID only and does not comprise a TA command, an uplink grant, and a temporary C-RNTI, from the service network.

27. The method of claim 25, wherein, when the determination result indicates that there is no association information corresponding to the types of on-demand SI, the random access procedure comprises:
    transmitting a random access preamble configured for contention-based random access procedures to the service network;
    receiving a random access response corresponding to the random access preamble from the service network; and
    transmitting a message for a scheduled transmission, which comprises information requesting the on-demand SI, to the service network, in response to receiving the random access response.

28. The method of claim 27, wherein the random access preamble to be transmitted is selected randomly from a set of random access preambles configured by the service network for contention-based random access procedures.

* * * * *